(12) United States Patent
Kumar et al.

(10) Patent No.: US 10,336,435 B2
(45) Date of Patent: Jul. 2, 2019

(54) EROSION RESISTANT BLADE AND BLADE COATING

(71) Applicant: Sikorsky Aircraft Corporation, Stratford, CT (US)

(72) Inventors: Rajesh S. Kumar, Ellington, CT (US); Robert A. Barth, South Windsor, CT (US); Wayde R. Schmidt, Pomfret Center, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 344 days.

(21) Appl. No.: 15/118,548

(22) PCT Filed: Feb. 14, 2014

(86) PCT No.: PCT/US2014/016505
§ 371 (c)(1),
(2) Date: Aug. 12, 2016

(87) PCT Pub. No.: WO2015/122909
PCT Pub. Date: Aug. 20, 2015

(65) Prior Publication Data
US 2017/0043860 A1 Feb. 16, 2017

(51) Int. Cl.
*B64C 11/20* (2006.01)
*B32B 25/20* (2006.01)
(Continued)

(52) U.S. Cl.
CPC ............ *B64C 11/205* (2013.01); *B32B 3/12* (2013.01); *B32B 5/028* (2013.01); *B32B 5/18* (2013.01); *B32B 15/08* (2013.01); *B32B 15/095* (2013.01); *B32B 27/065* (2013.01); *B32B 27/12* (2013.01); *B32B 27/283* (2013.01); *B32B 27/40* (2013.01); *C08G 18/61* (2013.01); *C09D 175/04* (2013.01); *C09D 183/04* (2013.01); *C09D 183/10* (2013.01); *B32B 2250/03* (2013.01);
(Continued)

(58) Field of Classification Search
CPC ... B64C 11/205; C09D 175/04; C09D 183/14; C09D 183/10; B32B 2603/00
See application file for complete search history.

(56) References Cited

U.S. PATENT DOCUMENTS 5,760,155 A 6/1998 Mowrer et al.
6,341,747 B1 * 1/2002 Schmidt ............... B64C 11/205
244/121

(Continued)

FOREIGN PATENT DOCUMENTS

DE 2810731 9/1979
EP 2412771 2/2012

OTHER PUBLICATIONS

International Search Report for International Application PCT/US14/16505; International Filing Date: Feb. 14, 2014; dated May 9, 2014; 10 pages.
(Continued)

*Primary Examiner* — Ramsey Zacharia
(74) *Attorney, Agent, or Firm* — Cantor Colburn LLP

(57) ABSTRACT

Airfoil blades are disclosed having a coating thereon that includes a polyurethane, a polysiloxane, and a linking agent that promotes a connection between the polyurethane and the polysiloxane.

11 Claims, 3 Drawing Sheets

(51) Int. Cl.
  *B32B 27/40*   (2006.01)
  *C09D 175/04*  (2006.01)
  *C09D 183/04*  (2006.01)
  *C09D 183/10*  (2006.01)
  *B32B 5/18*    (2006.01)
  *C08G 18/61*   (2006.01)
  *B32B 27/28*   (2006.01)
  *B32B 5/02*    (2006.01)
  *B32B 15/08*   (2006.01)
  *B32B 15/095*  (2006.01)
  *B32B 27/06*   (2006.01)
  *B32B 27/12*   (2006.01)
  *B32B 3/12*    (2006.01)
  *C08G 77/458*  (2006.01)

(52) U.S. Cl.
  CPC ....... *B32B 2250/04* (2013.01); *B32B 2255/26* (2013.01); *B32B 2266/0278* (2013.01); *B32B 2266/06* (2013.01); *B32B 2307/554* (2013.01); *B32B 2307/584* (2013.01); *B32B 2307/712* (2013.01); *B32B 2307/714* (2013.01); *B32B 2405/00* (2013.01); *B32B 2603/00* (2013.01); *B32B 2605/18* (2013.01); *C08G 77/458* (2013.01)

(56) References Cited

U.S. PATENT DOCUMENTS

| | | |
|---|---|---|
| 7,773,291 B2 | 8/2010 | Smith |
| 8,604,152 B2 | 12/2013 | Webster et al. |
| 2002/0098755 A1 | 7/2002 | Veiga |
| 2009/0291777 A1 | 11/2009 | Rajagopalan et al. |
| 2012/0028055 A1* | 2/2012 | Schmidt .............. B32B 27/40 |
| | | 428/450 |
| 2012/0237759 A1 | 9/2012 | Ehbing et al. |
| 2013/0142957 A1 | 6/2013 | Connelly et al. |
| 2013/0273309 A1 | 10/2013 | Schaefer |

OTHER PUBLICATIONS

Written Opinion of the International Searching Authority for International Application No. PCT/US14/16505; International Filing Date: Feb. 14, 2014; dated May 9, 2014; 7 pages.

* cited by examiner

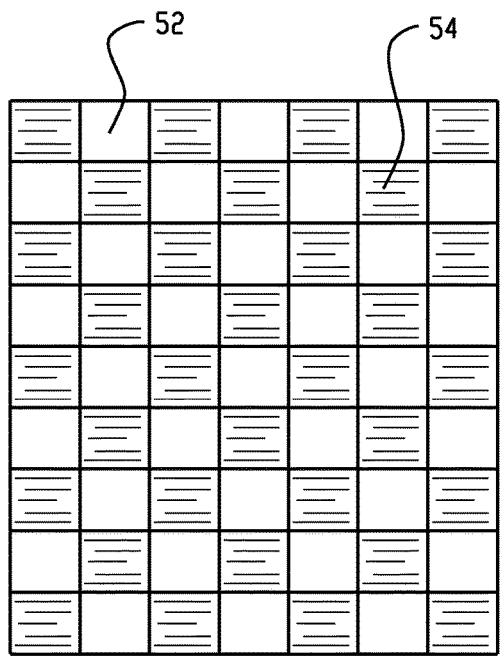
Fig. 5  Fig. 6
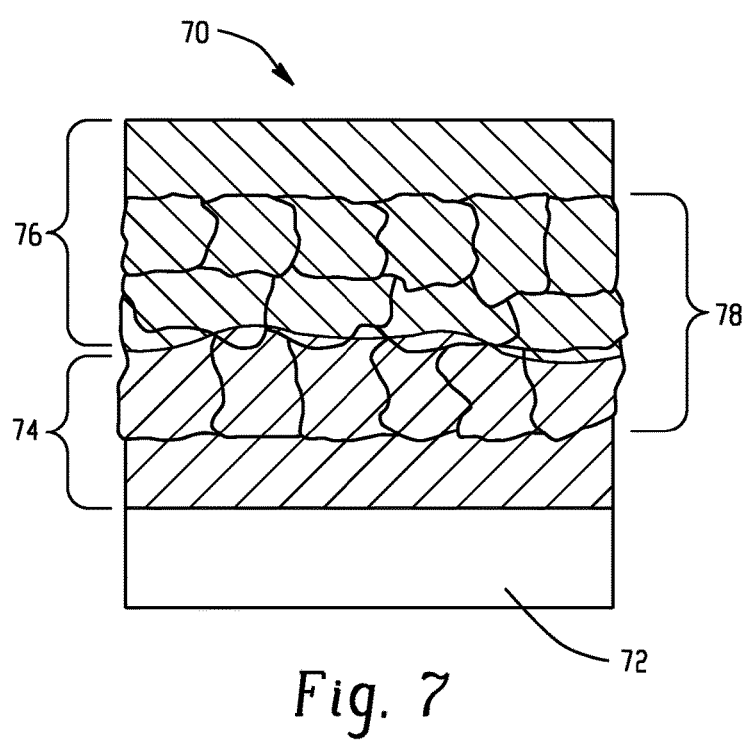
Fig. 7

EROSION RESISTANT BLADE AND BLADE COATING

CROSS REFERENCE TO RELATED APPLICATION

This application is a National Stage application of International Application No. PCT/US2014/016505, filed Feb. 14, 2014, which is incorporated by reference in its entirety herein.

BACKGROUND OF THE INVENTION

The leading edges of airfoil blades such as helicopter main and tail rotor blades, wind turbines, and airplane propellers are subject to erosion from contact with airborne matter such as rain or sand. In desert environments, sand erosion is often experienced on airfoil blades.

Sand, which is primarily made up of quartz, is significantly harder than many metals out of which airfoil blade leading edges are fabricated, such as nickel, aluminum, steel, titanium, and/or their alloys. This hardness difference results in significant degradation of blades in desert environments. As a result, this has become one of the largest logistics and maintenance burdens for helicopter operators in a sandy environment. Another significant problem is that a corona or halo, which is visible through night vision goggles, is generated around the rotor blades at night due to sand particles impacting Ti-based leading edges. The erosion phenomenon has been widely studied, for example, by S. M. Wiederhorn, B. J. Hockey, Effect of material parameters on the erosion resistance of brittle materials, J. Mater. Sci. 18 (1983) 766-780; I. M. Hutchings, R. E. Winter, Particle erosion of ductile metals: a mechanism of material removal, Wear 27 (1974) 121-128; L. Zhao, M. Maurer, F. Fischer, E. Lugscheider, Surf. Coat. Technol. 185, (2004) 160-165; I. Finnie, Erosion of surfaces by solid particles, Wear 3 (1960) 87-103; J. G. A. Bitter, A study of erosion phenomena. Part I&2 Wear 6 (1963) 5-21 and 169-190; and I. M. Hutchings, Ductile-brittle transitions and wear maps for the erosion and abrasion of brittle materials, J. Phys. D: Appl. Phys. 25 (1992), A212-A221.

Typical metal erosion strips generally cover approximately one inch of the blade surface as measured from the leading edge. The most severe wear in sand erosion patterns on, for example, a UH-60L main rotor blade, is generally at the tip cap and covers nearly 50% of the tip cap surface. Leading edge wear ranges from approximately 0.5" to 6.0" in width measured from the end of erosion strip. The erosion takes place on the top and bottom surfaces of the blade as well as at the leading edge. The tail rotor blade erodes primarily at the tips with approximately one-half the length of the blade along the leading edge affected.

Recently, soft polymeric coatings in tape and sprayed forms have been applied onto blade leading edges to control sand erosion. These coatings provide improved service life when compared to uncoated substrates but require frequent repair and replacement. One polymeric coating evaluated in a test program has demonstrated a significant 4-5 times improvement of sand erosion resistance. However, polymeric coatings often exhibit poor erosion performance in a rain environment due to their low strength and the high dynamic stress generated by the impacting raindrop. Erosion life of the polymer coating can be further reduced in extreme temperature and high humidity environments. The degradation from rain erosion is much faster if the rotor blade leading edge has been eroded by sand and small rock particles first, which causes surface defects that grow under the dynamic stress from the flow of raindrops upon impact. Composite coatings have been proposed utilizing a relatively soft elastomeric binder such as a polysiloxane with a relatively hard particle filler such as silica. However, concerns with providing sufficient adhesion between polysiloxanes and substrates and/or other coating components has limited the adoption of such coatings.

In view of the above, there remains a need to develop alternative coatings for erosion protection and other applications.

BRIEF DESCRIPTION OF THE INVENTION

According to some aspects of the invention, an article has a coating thereon comprising a polyurethane, a polysiloxane, and a linking agent that promotes a connection between the polyurethane and the polysiloxane.

In some aspects of the invention, the linking agent is a polyurethane-polysiloxane copolymer.

In some aspects of the invention, the linking agent is a coupling agent comprising functional groups reactive with groups on the polyurethane and functional groups reactive with groups on the polysiloxane. In some aspects of the invention, the coupling agent is a functionalized particle.

In some aspects of the invention, the polyurethane, the polysiloxane, and the linking agent are all in the same layer.

In some aspects of the invention, the polyurethane and the polysiloxane are in separate layers, with the linking agent disposed between the polyurethane layer and the polysiloxane layer.

In some aspects, the linking agent is a layer comprising a polyurethane-polysiloxane copolymer disposed between the polyurethane layer and the polysiloxane layer.

In some aspects, the linking agent is a multi-cellular porous structure such as a foam (e.g., a polyurethane foam), disposed between the polyurethane layer and the polysiloxane layer.

In some aspects of the invention, the article is an aircraft component.

In some aspects of the invention, the article is an airfoil blade having the coating disposed on at least a portion of a leading edge thereof. In some aspects, the airfoil blade is a helicopter rotor blade.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

FIG. 5 is a schematic depiction of an in-plane configuration having polyurethane and polysiloxane portions;

FIG. 6 is a schematic depiction of an in-plane configuration having polyurethane and polysiloxane portions; and FIG. 7 is a schematic depiction of a two-layer coated article with a multi-cellular structure linking agent as described herein;

DETAILED DESCRIPTION OF THE INVENTION

Figure 1:
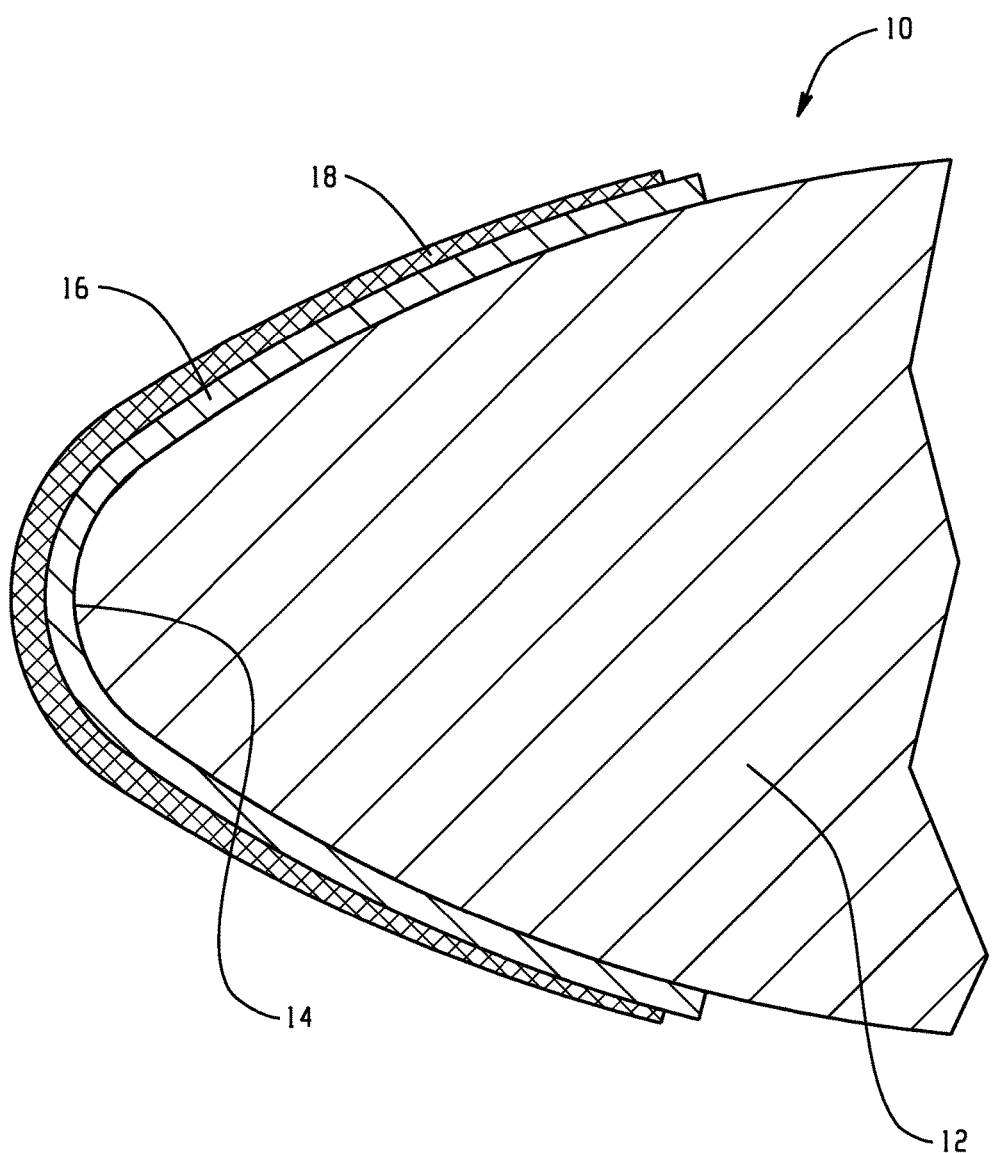
FIG. 1 is a schematic depiction of a portion of an exemplary airfoil blade as described herein.

As mentioned above, the coating comprises a polyurethane. The polyurethane is the reaction product of a component that includes one or more polyisocyanates with a component that includes one or more polyols. The polyisocyanate may be one or more of any of a number of polyisocyanates as are well-known for applications in the production of polyurethane foams. Exemplary polyisocyanates include, but are not limited to aromatic polyisocyanates, such as MDI (e.g., 4,4'-MDI, blends of 4,4'-MDI and 2,4'-MDI, MDI prepolymer, and modified polymeric MDI containing monomeric MDI), toluene diisocyanate (TDI), p-phenylene diisocyanate (PPDI), naphthalene diisocyanate (NDI), and o-tolidine diisocyanate (TODI), as well as aliphatic polyisocyanates such as 1,6-hexamethylene diisocyanate (HDI), isophorone diisocyanate (IPDI), tetramethylxylene diisocyanate (TMXDI), and cyclohexane diisocyanate (CHDI). Mixtures of any of the aforementioned polyisocyanates or other known polyisocyanates may also be used. In one exemplary embodiment, the polyisocyanate is a modified MDI (e.g., MONDUR PC sold by Bayer) or MDI prepolymer (e.g., LUPRANATE 5040 sold by BASF).

The polyol used to form the polyurethane may be one or more of any of a number of polyols as are well-known for applications in the production of polyurethane foams. Exemplary polyols include, but are not limited to polyether polyols (e.g., prepared by reaction of ethylene oxide and/or propylene oxide with polyol initiators such as propylene glycol, glycerine, toluene diamine, sorbitol, or sucrose, to name a few), polyester polyols (e.g., prepared by polyesterification of low molecular weight polyacids such as malonic acid, succinic acid, adipic acid, carballylic acid with low molecular weight polyols such as propylene glycol, 1,4-butane diol, and the like, and also polycaprolactone polyols), polycarbonate polyols, polybutadiene polyols, etc.

Polyurethane resins used in the coatings described herein are available commercially. Examples of commercially available resins include, but are not limited to Chemglaze M331 and Chemglaze M201 manufactured by Lord Corporation of Erie Pa.

As mentioned above, the coating also includes a polysiloxane. Polysiloxanes, also known as silicones, are characterized by the presence of polymer units having the general formula:

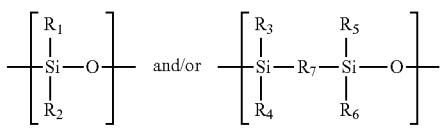

where $R_1$, $R_2$, $R_3$, $R_4$, $R_5$, and $R_6$ each independently represent a monovalent organic radical, and $R_5$ represents a divalent organic linking group. Exemplary groups for $R_1$-$R_6$ can include substituted or unsubstituted alkyls of 1 to 6 carbon atoms and substituted or unsubstituted aryls of 6 to 20 carbon atoms. In a more specific exemplary embodiment each of $R_1$-$R_6$ is an unsubstituted alkyl of 1 to 4 carbon atoms, and in a still more specific exemplary embodiment each of $R_1$-$R_6$ is a methyl group. Depending on available synthesis pathways, any of the $R_1$-$R_6$ and aryl groups can be substituted with functional or non-functional substituents, including but not limited to unsaturated C—C double bonds, halogen, oxirane, hydroxyl, and the like. Also, terminal silarylene and siloxane groups on the copolymer molecule can provide an active hydrogen (either a silyl hydrogen or siloxyl hydrogen) for attaching functional or non-functional substituents. $R_7$ can be any type of divalent organic linking group, including substituted or unsubstituted aliphatic groups of 1-12 carbon atoms, or substituted or unsubstituted arylene radicals which can provide high temperature performance such as on a turbine fan airfoil. Exemplary arylene radicals include substituted or unsubstituted arylene (including alkylenearylene) of 6-20 carbon atoms, such as phenylene (e.g., 1,4-divalent phenylene). Commercially available polysiloxanes include DCS-8024 (silethylphenylene) (dimethylsiloxane) copolymer available from Gelest, Inc. of Morrisville, Pa., Gelest OE™ 43, a 2-part silicone RTV encapsulant of a (silethylphenylene)(dimethylsiloxane) copolymer in a 1:1 kit, also available from Gelest, Inc., and Xiameter RBC-1660-65 compound and one component or two component RTV silicone rubbers available from Dow Corning.

As mentioned above, the coating also includes a linking agent that promotes a connection between the polyurethane and the polysiloxane. In some embodiments, the linking agent is a polyurethane-polysiloxane copolymer. Such copolymers are known, and can be prepared by conventional urethane polymerization reactions between a polyol and a polyisocyanate, with an active hydrogen-terminated polysiloxane pre-polymer included in the reaction mixture. The active hydrogen terminal groups on the polysiloxane will react with isocyanate groups on the polyisocyanate during the polymerization reaction so that polysiloxane chains are incorporated into the polymer chains. Polyurethane-polysiloxane copolymers are commercially available. Examples of commercially available resins include, but are not limited Ameron PSX engineered siloxanes offered by PPG, or those disclosed in "Alkoxysilane Functionalized Polyurethane/Polysiloxane Copolymers: Synthesis and the Effect of End-Capping Agent," Polymer Bulletin, vol. 59, no. 1, pp. 53-63, June 2007.

In some embodiments, the linking agent is a coupling agent comprising functional groups that are reactive with groups on the polyurethane and functional groups that are reactive with groups on the polysiloxane. Depending on the functional groups available for coupling on the polyurethane and the polysiloxane, the coupling agent can utilize a single type of functional group that is reactive with the functional groups on each of the polyurethane and the polysiloxane, or the coupling agent can utilize different types of functional groups that are individually reactive with the functional groups on the polyurethane and with the functional groups on the polysiloxane. For example, if the polyurethane and the polysiloxane each have active hydrogen functional groups, a coupling agent could have functional groups (e.g., isocyanate groups, carboxylic acid functional groups) that are reactive with active hydrogen groups. The above-referenced Ameron PSX materials can be functionalized, as can particulate linking groups such as Si—O structures, platelet ceramics such as SiC, AlN, as well as oxides, nitrides, etc., which have surfaces that can be chemically functionalized with the desired reactive groups.

In some embodiments, the linking agent is a Si—O particulate structure, such as a hybrid plastic, e.g., polyhedral oligomeric silsesquioxane (POSS). In general, POSS has a polyhedral morphology and are compounds represented by the chemical formula $RSiO_{1.5}$, where R is an organic substituent such as hydrogen, siloxy, alkyl, alkene, aryl, arylene, silene, methyl, ethyl, iso-butyl, iso-octyl, phenyl, cyclic or linear aliphatic or aromatic groups, acrylate, methacrylate, epoxy, vinyl, fluoro-alkyl, alcohol, ester, amine, ketone, olefin, ether, halide, thiol, carboxylic acid, norbornenyl, sulphonic acid, polyethylene glycol, polyethylene oxalate, or other desired organic group. In particular examples designed for aeronautic applications, the POSS is trisnorbornenylisobutyl-POSS, trisilanolisooctyl-POSS, trisilanolphenyl-POSS, trisilanolisobutyl-POSS, trisilanolcyclopentyl-POSS, trisilanolcyclohexyl-POSS, vinyl-containing-POSS or combinations thereof.

Polysilsesquioxanes are materials represented by the formula $[RSiO_{1.5}]_\infty$ where $\infty$ is the molar degree of polymerization and each R is independently an organic substituent such as hydrogen, siloxy, alkyl, alkene, aryl, arylene, silene, methyl, ethyl, iso-butyl, iso-octyl, phenyl, cyclic or linear aliphatic or aromatic groups, acrylate, methacrylate, epoxy, vinyl, fluoro-alkyl, alcohol, ester, amine, ketone, olefin, ether, halide, thiol, carboxylic acid, norbornenyl, sulphonic acid, polyethylene glycol, polyethylene oxalate, or other desired organic group, with the proviso that the R content of the POSS includes the requisite functional groups that are reactive with functional groups on the polyurethane and the polysiloxane. Polysilsesquioxanes may be either homoleptic or heteroleptic. Homoleptic systems contain only one type of R group while heteroleptic systems contain more than one type of R group. In some embodiments, a homoleptic POSS can be used where each R group is reactive with functional groups on the polyurethane and the polysiloxane. In some embodiments, a heteroleptic POSS can be used where a portion or different portions of the R groups are reactive with groups on the polyurethane and the polysiloxane, and some portion or portions of the R groups are non-reactive. In particular examples designed for aeronautic applications, the POSS is trisnorbornenylisobutyl-POSS, trisilanolisooctyl-POSS, trisilanolphenyl-POSS trisilanolisobutyl-POSS, trisilanolcyclopentyl-POSS, trisilanolcyclohexyl-POSS, vinyl-containing-POSS, or combinations thereof, as defined above. Any of the above POSS structures can be functionalized with groups such as OH, alkoxide, carboxylic acid groups, acetate, peroxide amine, isocyanate, etc. Chemical bonding between the functionalized POSS and the polyurethane and polysiloxane can be accomplished through chemical reaction conditions based on the functional groups involved. For example, isocyanate and hydroxyl or amine groups will react relatively spontaneously via a urethane/urea condensation reaction. In another example, carboxylic acid and hydroxyl groups can be reacted via an ester-forming condensation reaction in the presence of a transesterification catalyst.

Other conventional coating materials, such as fillers, pigments, surfactants and other coating aids, antioxidants, biocides, curing or cross-linking agents, etc. can be included in any of the coatings described herein.

An exemplary embodiment of an airfoil blade coated with a coating or layer as described herein is depicted in FIG. 1. As shown in FIG. 1, a portion of an airfoil blade assembly 10 is depicted in a cross-sectional schematic view (not necessarily to scale). Blade body 12, which may be a polymer matrix composite assembly covered by a metal sheath has a leading edge 14 covered by an optional metal erosion-resistant strip 16 such as a nickel, aluminum or titanium strip. Coating 18 is disposed over the metal erosion-resistant strip 16, and may be a single-layer or multi-layer coating. Total coating thickness can range from about 25 µm to about 2000 µm, more specifically from about 100 µm to about 500 µm. In other embodiments, the coating 18 can be applied directly to an airfoil blade substrate without an erosion-resistant strip 16.

Figure 2:
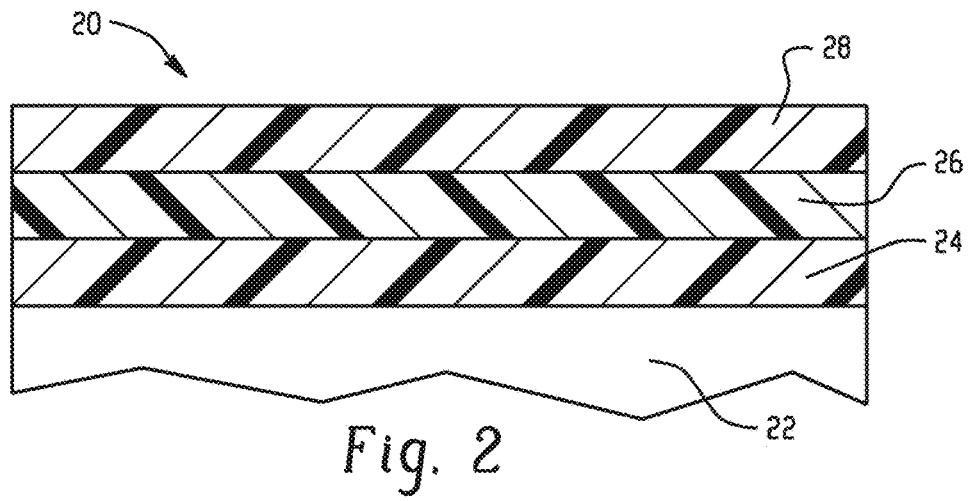
FIG. 2 is a schematic depiction of a three-layer coated article as described herein.

In some embodiments, the above-described linking agent(s) can be incorporated into a single layer together with the polyurethane and the polysiloxane. In other embodiments, the polyurethane and the polysiloxane can be in separate layers, with the linking agent interposed between the polyurethane layer and the polysiloxane layer. For example, a polyurethane-polysiloxane copolymer can be mixed in a coating composition with a polyurethane and a polysiloxane and coated as a single layer (or multiple layers of the same composition) onto a substrate. Alternatively, a polyurethane-polysiloxane copolymer layer can be interposed between a polyurethane layer and a polysiloxane layer. Such an embodiment is shown in FIG. 2, where article 20 has substrate 22 with a polyurethane layer 24 disposed thereon. A polyurethane-polysiloxane copolymer layer 26 is disposed on the polyurethane layer 24, and a polysiloxane layer 28 is disposed on the polyurethane-polysiloxane copolymer layer 26.

Figure 3:
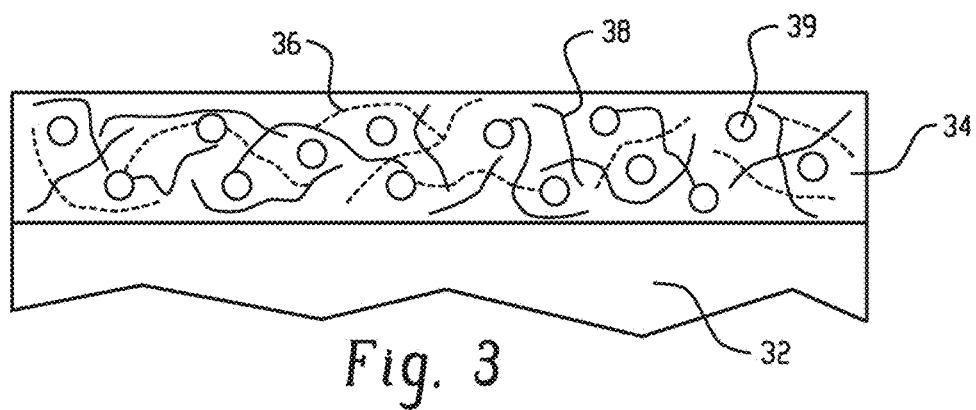
FIG. 3 is a schematic depiction of a single layer coated article as described herein.

FIG. 3 depicts a single layer embodiment where substrate 32 has coating layer 34 disposed thereon. Coating layer 34 includes polyurethane polymer chains 36, polysiloxane polymer chains 38, and functional linking particles 39 (e.g., functionalized polyhedral oligomeric silsesquioxane ("POSS") particles) having functional groups that are reactive with groups on the polyurethane and functional groups that are reactive with groups on the polysiloxane to provide a connection between the polyurethane and the polysiloxane.

Figure 4:
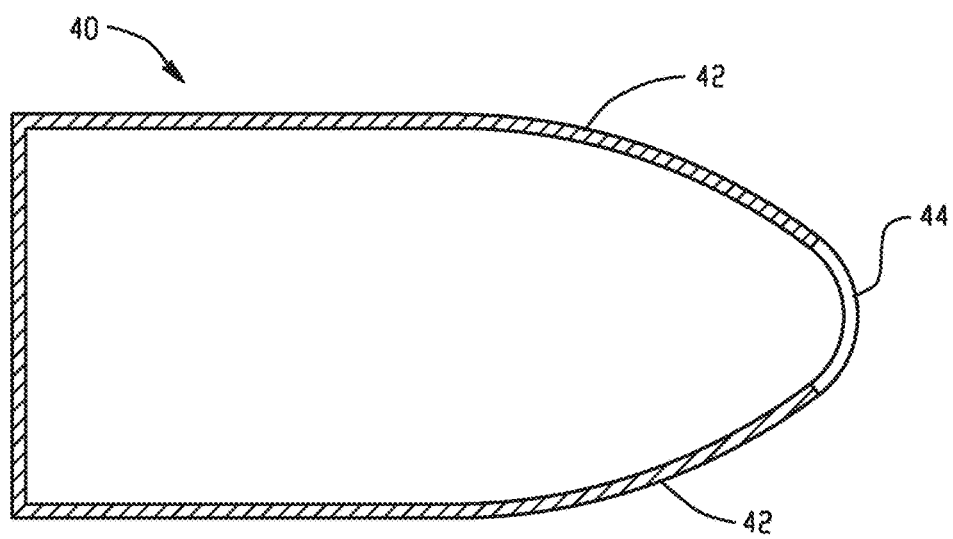
FIG. 4 is a schematic depiction of a portion of an exemplary airfoil blade as described herein.

Of course, the layer ordering and configurations depicted in FIGS. 1-3 are exemplary in nature, and other layer orderings and/or configurations can be used as well. For example, in an exemplary embodiment as shown in FIG. 4, a silicone-containing layer (e.g., a pure polysiloxane or high polysiloxane-content layer or otherwise linked polyurethane-polysiloxane as described herein) can be disposed as a surface layer on portions 42 of the airfoil blade 40 away from the leading edge portion 44 for low angle (e.g., less than 45 degrees, e.g., 30 degrees) particle impact and a pure polyurethane or high polyurethane-content layer can be disposed on the leading edge portion 44 for high angle impact (e.g., greater than 45 degrees, e.g., 90 degrees). Another approach that could be used as an alternative or in conjunction with the embodiment depicted in FIG. 4 would be to provide a layer ordering where a coating with higher polysiloxane content is used as a surface layer (with a polyurethane or high polyurethane-content layer underneath) in the airfoil blade portions 42 for low-angle impact, and a polyurethane or high polyurethane-content layer as the outermost layer in the airfoil blade leading edge portion 44 (with a polysiloxane or high polysiloxane-content layer underneath) where impact angle is high. As used herein, a high polyurethane-content layer or material comprises greater than 50 volume % polyurethane, and a high polysiloxane-content layer or material comprises greater than 50 volume % polysiloxane.

Silicone and polyurethane have other properties of interest that may dictate layer ordering. For example silicone has better ice adhesion properties (i.e., ice doesn't stick readily) and better ultraviolet resistance than polyurethane. On the other hand, polyurethane can perform better than silicone under rain erosion and often has better room temperature adhesion strength with substrates. The hybrid solutions discussed herein utilizing linked polyurethanes and polysiloxanes can provide for tailored layer configurations to provide unique performance characteristics. For example, in addition to the above-described configurations, other exemplary embodiments can involve disposing polyurethane or polyurethane-rich segments and polysiloxane or polysiloxane-rich segments in various co-planar configurations in the same layer or planar segment of an article such as an airfoil blade. Two such exemplary configurations are shown in FIGS. 5-6 where a top view of a hybrid structure is shown and polyurethane segments 52, 62 are arranged in the same plane along with polysiloxane segments 54, 64. The segments can be regular geometric shapes such as squares or rectangles as shown in FIG. 5, or can be irregular shapes as shown in FIG. 6.

In embodiments where the polyurethane and polysiloxane are in separate or overlapping layers or adjacent portions within a single plane or layer, the linking agent can also be a multicellular structure. Such an embodiment is depicted in FIG. 7, where article 70 comprises a substrate 72 having a polyurethane layer 74 and a polysiloxane layer 76 disposed thereon. Interposed between the polyurethane layer 74 and the polysiloxane layer 76 is a multi-cellular structure 78. The multi-cellular structure can be an open-cell polymer foam such as a polyurethane foam, or it can be a fabricated structure have an ordered cellular (e.g., honeycomb) structure, or a web or mesh structure, or another type of disordered cellular structure including reticulated and non-uniform structures. In some embodiments, the multi-cellular structure is formed from the same polyurethane as the layer 74 or it can be formed from a different polyurethane. In some embodiments, the multi-cellular structure is formed from the same polysiloxane as the layer 76 or it can be formed from a different polysiloxane. In other embodiments, the multi-cellular structure can be formed from a different material such as a metallic reticulated structure, which can optionally be surface treated to be compatible with the polysiloxane in the layer 76 and/or the polyurethane in the layer 74.

The layers and segments described herein can be deposited by known techniques, including but not limited to spray coating, roll coating, blade coating, casting, extrusion, etc. The compositions to be applied can be prepared as solvent-borne or water-borne dispersions, powder compositions, or polymer melts as is also known in the art. In some embodiments, the materials can be pre-formed solid form such as plies, films, or tapes, which can be applied to an airfoil blade or airfoil blade component by known techniques. Such tapes and the like are known in the art, including but not limited to, 3M Polyurethane Protective Tape 8671 or 3M™ Polyurethane Protective Tape 8545.

An airfoil blade with which the coatings, layers, and/or segments as described herein can be used includes any of a number of known types such as helicopter rotor blades, aircraft propeller blades, turbine engine fan and compressor blades, wind turbines, and various types of fan blades. In some embodiments, the airfoil blade is a helicopter rotor blade. In some embodiments, a coating is on a leading edge of an airfoil blade such as a helicopter rotor blade.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An airfoil blade having a coating disposed on a leading edge thereof, the coating comprising a polyurethane, a polysiloxane, and a linking agent that promotes a connection between the polyurethane and the polysiloxane; wherein the polyurethane and the polysiloxane are in separate layers with the linking agent disposed between the polyurethane layer and the polysiloxane layer.

2. The airfoil blade of claim 1, wherein the linking agent is a polyurethane-polysiloxane copolymer.

3. The airfoil blade of claim 1, wherein the linking agent is a coupling agent comprising functional groups reactive with groups on the polyurethane and functional groups reactive with groups on the polysiloxane.

4. The airfoil blade of claim 3, wherein the coupling agent is a functionalized particle.

5. The airfoil blade of claim 1, wherein the linking agent is a layer comprising a polyurethane-polysiloxane copolymer, disposed between the polyurethane layer and the polysiloxane layer.

6. The airfoil blade of claim 1, wherein the linking agent is a multi-cellular structure disposed between the polyurethane layer and the polysiloxane layer.

7. The airfoil blade of claim 6, wherein the multi-cellular structure is a polymer foam.

8. The airfoil blade of claim 7, wherein the polymer foam is a polyurethane foam.

9. The airfoil blade of claim 1, wherein the airfoil blade is a helicopter rotor blade.

10. The airfoil blade of claim 1, wherein the airfoil blade further comprises polysiloxane layer on a surface of the airfoil blade away from of the leading edge.

11. An airfoil blade having a coating disposed on a leading edge thereof, the coating comprising a polyurethane, a polysiloxane, and a linking agent that promotes a connection between the polyurethane and the polysiloxane, wherein the coating comprises polyurethane segments and polysiloxane segments in a co-planar configuration in the same layer or planar segment.

* * * * *